Inventor
Clemson H. Ward.

Patented Jan. 3, 1933

1,893,009

UNITED STATES PATENT OFFICE

CLEMSON H. WARD, OF BETHLEHEM, PENNSYLVANIA, ASSIGNOR TO BETHLEHEM STEEL COMPANY, A CORPORATION OF PENNSYLVANIA

CHARGE CALCULATOR

Application filed September 21, 1929. Serial No. 394,167.

This invention relates to calculating instruments in which various quantities may be represented numerically by proportionate values of electrical current, resistance and voltage and in which means are provided for operating upon the quantities numerically by suitably combining the corresponding electrical values in accordance with Ohm's law and other well known electrical principles; the desired results being obtained from electrical measurements of the combinations. For example, if it is desired to multiply factor X by factor Y to obtain product Z, factor X may be represented by a resistance of KX ohms, (K being any convenient constant) Y is then represented by a current thru resistance X of KY amperes, whereupon Z will be indicated by a potential of KZ volts across the resistance. It is obviously immaterial which two of these factors are known and hence both multiplication and division can be carried out on the basis of the same electrical relation. Addition may be accomplished by putting representative resistances or voltages in series and measuring their totals. When voltages are used in this manner the algebraic sum is obtained and subtraction is therefore possible by reversing the polarity of any desired voltage.

My invention is of greatest value in rapidly solving problems involving two or more mathematical operations on a number of quantities—particularly where compound factors are involved such as in the solution of simultaneous equations. Such a problem is illustrated by the calculation of the quantities of various materials required to make up a furnace charge of given composition. In this case the compound factors are the sums of percentages of chemical elements in each material and in the composition desired. Each of these is multiplied by a factor representing the quantity of the material in question or of the desired mixture. The accurate solution of such a problem involves the solution of as many simultaneous equations as there are materials to be used. When this number exceeds five or six and the materials are of complex analysis, it becomes impractical to solve the equations and methods of approximation have heretofore been used.

In order to clearly illustrate the principle of the apparatus and its method of operation, the following description will be limited to the calculation of furnace charges but it is obvious that the apparatus may be used to advantage in other calculations with or without suitable modifications in the range of the instruments and in the switching equipment used to connect them.

Figure 1:
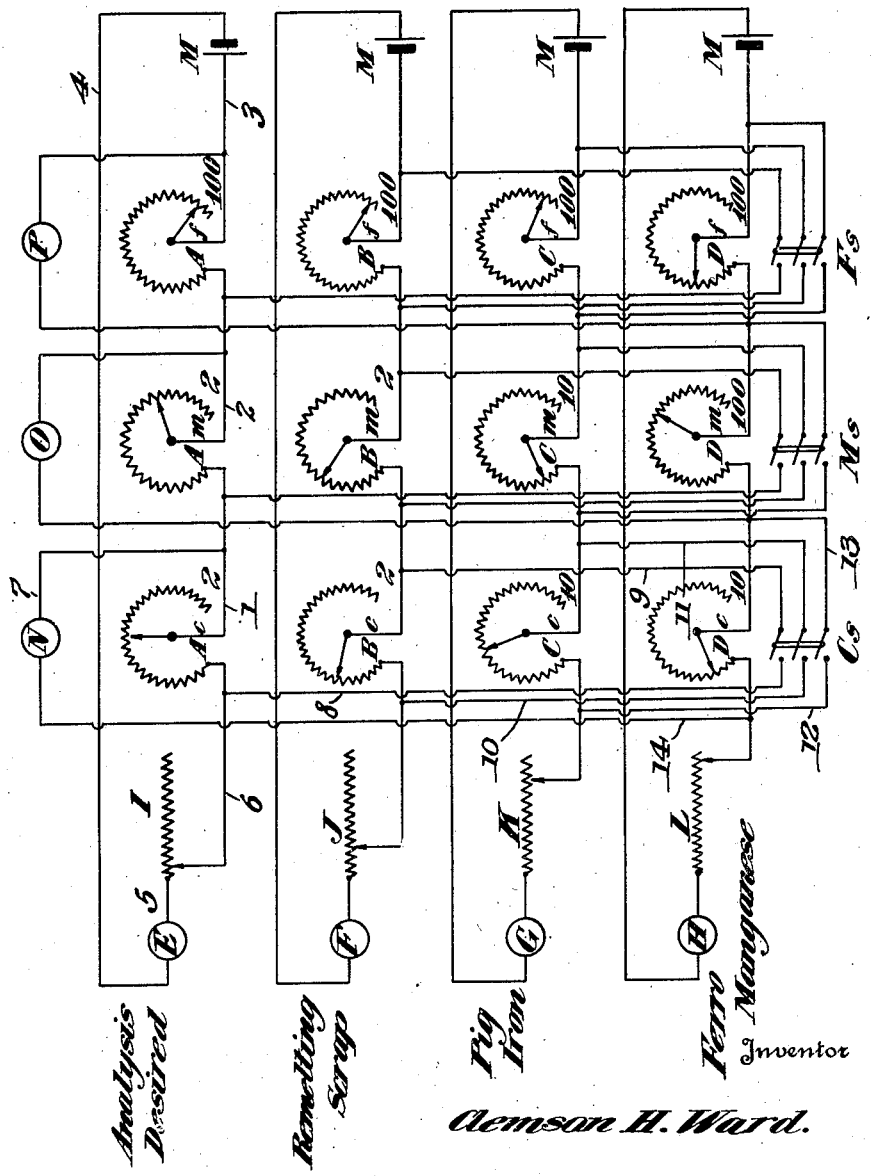
Figure 2:
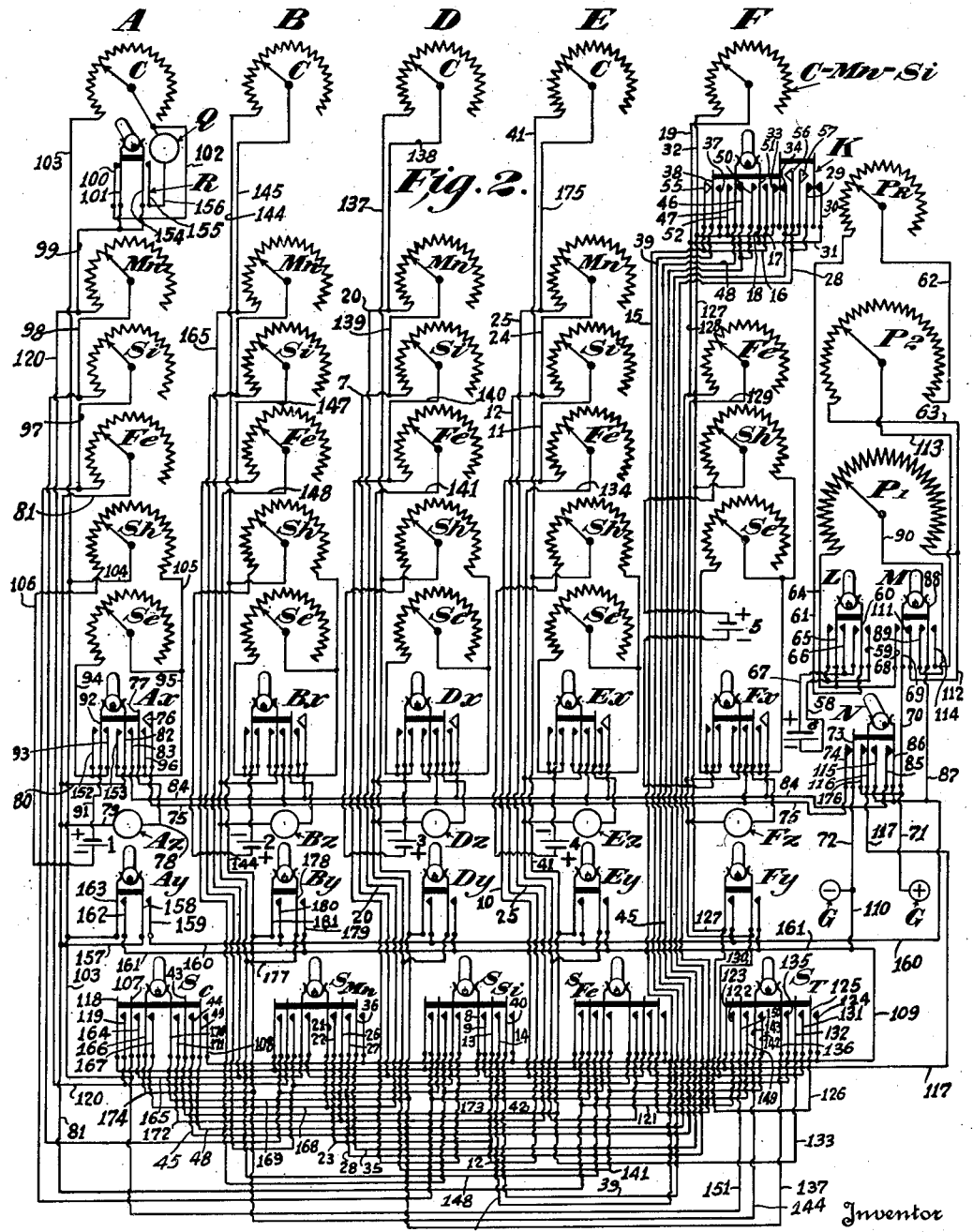

In the drawings, Fig. 1 shows an assembly of apparatus by which the principles of operation may be illustrated. Fig. 2 shows a simplified form of commercial calculator in which the essential switching and measuring instruments are included.

Referring to Fig. 1, $A_c$, $A_m$ and $A_f$ represent three variable resistances or rheostats having total resistances of 2, 2 and 100 ohms respectively as indicated by the subjoined numerals. These rheostats are used to represent the respective percentages of carbon, manganese and iron in a ferrous alloy—in the present case an alloy which it is desired to produce. The adjustment of the rheostats is such that 1 ohm represents 1%—the settings indicated in Fig. 1 representing approximately 1% carbon 1.5% manganese and 97.5% iron. Similarly the rheostats of the B, C and D series are adjusted to represent the respective percentages of carbon, manganese and iron in a remelting scrap, a pig iron and a ferromanganese alloy which, for the purpose of illustration, are considered available for compounding the desired alloy. It should be noted that the sum of the resistances in each of the four horizontal groups is made equal to 100 ohms (representing 100% of the composition of each material).

The three rheostats of each horizontal group are connected in series and 4 complete circuits are formed which (taking the A series as an example) comprise: Rheostat $A_c$, conductor 1, rheostat $A_m$, conductor 2, rheostat $A_f$, conductor 3, battery M, conductor 4, milliammeter E, conductor 5, variable resistance I and conductor 6. It will be noted that when switches $C_s$, $M_s$ and $F_s$ are open, as shown, each of the four horizontal circuits constitutes an independent unit in which the intensity of current is dependent upon the E. M. F. of the battery and the resistance of the circuit. Furthermore if the available resistance in rheostats I, J etc. is made several times that of the balance of the circuits, the intensity of current in each circuit will be controllable within a considerable range by means of these rheostats.

To illustrate the principle of my invention I have elected to represent percentage by resistance, 1 ohm being arbitrarily chosen to represent 1%. In like manner, 1 milliampere of current in any of the horizontal circuits is chosen to represent 10 pounds of the material to which the circuit is assigned. For example, in the circuit containing rheostats $Ac$, $Am$ and $Af$, 1 milliampere would represent 10 pounds of the alloy to be produced, in the B circuit 10 pounds of remelting scrap, etc.

Bearing in mind that the sum of the resistances $Ac$—$Am$—$Af$, $Bc$—$Bm$—$Bf$ etc. in each horizontal circuit has been made equal to 100 ohms, it will be obvious that the total potential drops across the three rheostats in any of the circuits are proportional to the currents flowing in the circuits and that said potential drops may equally well be used to represent weights of materials. Furthermore, the potential drop across any individual rheostat will represent the weight of the element the percentage of which the rheostat has been adjusted to represent. For example in the A circuit, in which $Ac$ is set to represent 1% carbon (1 ohm), $Am$—1.5% manganese (1.5 ohms) and $Af$ 97.5% iron (97.5 ohms), if rheosat I is adjusted so that the current in the circuit is 100 milliamperes (1000 pounds), the total potential drop across $Ac$, $Am$ and $Af$ will be $100 \times .100 = 10$ volts or 10,000 millivolts, and 10 millivolts will therefore represent 1 pound of material. Taking the individual rheostats, the drop across $Ac$ (1 ohm) will be $1 \times .100 = .1$ volt or 100 millivolts (10 pounds of carbon), across $Am$ 150 millivolts (15 pounds of manganese) and across $Af$ 9750 millivolts (975 pounds of iron).

In Fig. 1 it will be noted that closure of any one of the switches $Cs$, $Ms$ or $Fs$ completes a vertical circuit in which the four rheostats representing the weights of a given element are in series and in which a galvanometer N, O or P is included. Thus in the left hand or carbon circuit, starting with galvanometer N I have: conductor 7, rheostat $Ac$, conductor 8, switch $Cs$, conductor 9, rheostat $Bc$, conductor 10, switch $Cs$, conductor 11, rheostat $Cc$, conductor 12, switch $Cs$, conductor 13, rheostat $Dc$ and return to N by means of conductor 14.

Each of the four horizontal or weight circuits form branches to the vertical circuits such as that just traced and under ordinary conditions currents in the horizontal circuits will divide in a highly complex manner, a portion of each flowing in the vertical circuit and other portions in the adjacent horizontal circuits. However, since the purpose of the vertical circuits is to arrive at a particular condition of the currents in the horizontal circuits, the mere fact that said complex currents are flowing and thereby causing deflection of the galvanometer in a vertical circuit gives us all the information needed.

The obvious condition to be fulfilled in the solution of a charge calculating problem is that the materials charged must cumulatively supply the correct weight of each of the elements required in the charge; in other words, the sum of the weights of each element in the charged materials must equal or balance the weight of said element in the required weight of the desired composition. Since, as pointed out above, I have represented the weight of each element in each of the charging materials and in the desired composite charge by the voltage drop across a rheostat, the solution of the problem requires that the sum of the voltage drops across the element rheostats of the materials circuits be made equal to that across the corresponding rheostats in the desired analysis circuit. The purpose of the respective vertical or balancing circuits is to indicate when this equality has been attained with respect to the elements which they represent.

To this end, it will be noted that the polarity of the battery supplying the "analysis desired" or A circuit is reversed with respect to those of the other three (B, C and D) circuits. If, therefore, the sum of the potential drops across rheostats $Bc$, $Cc$ and $Dc$ equals that across $Ac$ (100 millivolts in the case assumed), no current will flow in the vertical circuit when switch $Cs$ is closed and the condition of balance will be indicated by lack of movement in galvanometer N. The process of calculation consists in so adjusting the currents in the three lower horizontal circuits by means of rheostats J, K and L that this balanced condition is attained with respect to all (representing weights of charging materials) three elements. It should be noted that tests for balance must be made by closing only one of the switches $Cs$, $Ms$ and $Fs$ at a time, since the closure of two switches simultaneously would provide branched circuits in which the potential drops would not be comparable.

When balance has been attained, the weights of the charging materials may be read from the milliammeters F, G and H, using the assigned conversion factor of milliamperes to units of weight.

It has been pointed out above that the total weight of a furnace addition may be represented as well by the voltage drop across the series of resistances which represent 100% of its composition as by the current producing said voltage drop. This is equivalent to using the resistances (which are of equal value for each furnace addition) as shunts in the well known method of measuring current. In order to eliminate the expense and complication of providing an ammeter for each furnace addition I have used this voltage drop method of current measurement in the commercial form of calculator illustrated in Fig. 2. In order to provide greater accuracy and to still further reduce the complexity of equipment, I use a potentiometer for measuring these voltages and employ a single galvanometer to balance the potentiometer against these voltages as well as to balance the voltages representing single elements as in Fig. 1.

Fig. 2 shows a calculator for determining the proportions of a maximum of 4 ferrous materials for compounding a furnace charge. The charge consists of the four elements carbon, manganese, silicon and iron. Its composition is represented by the series of resistances headed by the letter A in which the rheostats C, M$n$, S$i$ and F$e$ may be set to represent the proportionate amounts of the elements denoted by these symbols. In like manner series B, D and E represent the composition of three charging materials or furnace additions. Series F, consisting of only two rheostats, illustrates the use of a switching arrangement by means of which a single rheostat may be used to represent any one of a plurality of elements (in this case either carbon, manganese or silicon) by providing for its connection to the desired balancing circuit.

In order to extend the range of rheostat A—$c$ without decreasing the accuracy with which it may be adjusted, an auxiliary fixed resistance Q may be inserted in the series by means of switch R. Resistance Q preferably equals the total resistance of the rheostat so that, for example, if each has a resistance of three ohms the range with switch R in the left position will be 0 to 3 and, in the right position, 3 to 6.

$P_1$ and $P_2$ are potentiometers with scales calibrated in terms of weight and percentage. $P_1$ preferably has a resistance ten times that of $P_2$. The two potentiometers are connected in series and current is supplied to them from a dry cell thru the reversing switch L and the control rheostat $P_R$. Either $P_1$ or $P_2$ may be connected to the measuring circuit by means of the switch M.

Each vertical series of percentage rheostats (A, B, D etc.) is provided with a pair of control rheostats (S$e$ and S$h$) which regulate the current thru the series. Rheostats S$e$ are in series with the percentage rheostats and with the shunt rheostats, S$h$. The latter complete return circuits to the batteries and supply current to the percentage rheostats by a potentiometer connection from their movable contacts. The series (A, B, D, etc.) are separately supplied with current from individual dry cells (1, 2, 3, 4 and 5) which are connected to switches A$x$, B$x$, etc. and control rheostats A$sh$, B$sh$, etc. It should be noted that the polarity of the battery supplying series A is reversed with respect to those supplying the other series and that the conductors connecting switches A$x$ and A$y$ with the potentiometer system are reversed accordingly.

Switches A$x$, B$x$, etc. are provided to permit accurate setting of the rheostats (A$c$, A$mn$—B$c$, B$mn$, etc.) by measuring potential drops across them in comparison with that across standard resistances A$z$, B$z$, etc. Resistances A$z$, B$z$, etc. each has a resistance equal to the total resistance of the rheostats in a single series when set to represent 100% of a material—normally 100 ohms. The rheostats may or may not be provided with scales calibrated in terms of percentage but in either case accuracy of setting may be insured by this comparative method. Its operation is described below.

Switches A$y$, B$y$, etc. connect the terminals of their corresponding series of rheostats to the potentiometer system whereby the voltage drop across the series—representing the weight of the material in question—may be determined.

Switches S$c$, SM$n$, etc. when thrown to the right connect in series all rheostats representing a given chemical element and include in the series a galvanometer connected thru terminals G—G. Thus, for example, when switch S$c$ is thrown to its right hand position, rheostats A—$c$, B—$c$, D—$c$, E—$c$ and F—$c$ (if switch K is in its left position) are connected in series and the circuit completed thru the galvanometer. The weight of carbon in the required charge (voltage across A—$c$) may then be balanced with the weight of carbon supplied by the furnace additions (sum of the voltages across B—$c$, D—$c$, E—$c$ and F—$c$) by adjusting the various current control dials (S$h$ and S$e$) until no deflection of the galvanometer is obtained.

Switch $S_T$ connects the voltages across the whole of all groups A, B, D, etc. in series and completes a circuit thru the galvanometer so that the total weight of the furnace additions may be checked against the weight of the charge required.

Switch N is used for connecting either the standard resistances A$z$, B$z$, etc. or individual percentage rheostats A$c$, BM$n$, etc. at will with the potentiometer system in conjunction with switches A$x$, B$x$, etc. and S$c$, SM$n$, etc. as explained below.

In order to clarify the function of each part I give below a summary of the process of calculating a furnace charge:

Assume that it is desired to make 1000 lbs.

of steel of the following analysis, using the following materials:

| Series | Material | Carbon | Manganese | Silicon | Iron |
|---|---|---|---|---|---|
| A | Analysis required | .90 | 1.10 | 3.00 | 95.00 |
| B | Scrap steel | .50 | .20 | .30 | 99.00 |
| D | Pig iron | 3.50 | .50 | 1.00 | 95.00 |
| E | Ferromanganese | 1.00 | 40.00 | .50 | 58.50 |
| F | Ferrosilicon | | | 80.00 | 20.00 |

Starting with all switches in their open positions, I proceed as follows:

(1) Set rheostats (A$c$, A$mn$, etc.) to approximate the percentages of the individual elements in the charge desired and the available materials using series A for the charge desired, series B for scrap steel etc. as indicated in the above table. In connection with the choice of series to represent the various materials, it should be noted that the choice is only restricted with respect to the "charge desired". The analysis of the "charge desired" must always be set up on series A since the battery connections of this series are reversed with respect to those of the other series. The materials used to make up the charge may be assigned to the various other series provided in the instrument so as to most fully represent their analyses. It may be necessary for example, to omit certain element rheostats from some of the series for reasons of economy, or limitations of space. Such short series should be used to represent the analyses of materials containing only a few elements in comparatively large percentages. The materials thus represented should also make up a relatively small part of the charge so that the minor amounts of elements contained therein which cannot be set up on the short series will not seriously affect the final analysis of the charge.

An example illustrating these points in the present case is furnished by the assignment of ferrosilicon to series F which contains only two element rheostats. The ferrosilicon used as an example is assumed to contain only silicon and iron and is therefore fully represented by the two rheostats of series F.

(2) Throw switch K to the right. This switch is included in the description and drawing to illustrate the possibility of using a single rheostat to represent any one of a plurality of elements. By throwing switch K to the right in the present case the top rheostat of series F is made to represent silicon. The switch accomplishes this function by setting up connections which (when switch S$si$ is closed) result in a complete circuit including the rheostat as well as the S$i$ rheostats of the A, B, D and E series and the galvanometer. A partial circuit will be traced herewith to show that this rheostat (F $c$—$mn$—$si$) when switch K is in the right hand position, bears the same relation to switch S$si$ as the other S$i$ rheostats. The tracing of the complete balancing circuit for silicon will be deferred till later.

Starting with rheostat D$si$ I have wire 7, contact 8 of switch S$si$, which makes contact with contact 9 when this switch is closed, wire 10, wire 11, rheostat E$si$, wire 12, contact 13, wire 14, wire 15, wire 16, contact 17 of switch K which in the right hand position of this switch makes contact with contact 51, wire 19, rheostat F $c$—$mn$—$si$, wire 32, contact 37 of switch K, contact 38, wire 39 and contact 40 of switch S$si$. The three rheostats D$si$, E$si$ and F $c$—$mn$—$si$ are thus in series when switch K is in its right hand position and switch S$si$ is closed.

In like manner switch K places rheostat F $c$—$mn$—$si$ in series with the manganese and carbon rheostats when in its center and left hand positions respectively and when the S$mn$ and S$c$ switches respectively are closed. The circuit for manganese is: rheostat D$mn$, wire 20, contact 21 of switch S$mn$, contact 22, wire 23, wire 12, wire 24, rheostat E$mn$, wire 25, contact 26 of switch S$mn$, contact 27, wire 28, contact 29 of switch K, contact 30, wire 31, wire 19, rheostat F $c$—$mn$—$si$, wire 32, contact 33 of switch K, contact 34, wire 35, contact 36 of switch S$mn$.

It should be noted that switch K places rheostat F $c$—$mn$—$si$ in one of three circuits (C, M$n$ or S$i$) and, at the same time closes the two circuits in which the rheostat is not inserted. Taking the carbon circuit for example with the switch K in its center position as shown in the drawings and by which the rheostat is placed in the manganese circuit I have: rheostat E$c$, wire 41, wire 42, contact 43 of switch S$c$, contact 44, wire 45, contact 46 of switch K, contact 47, wire 48 and contact 49 of switch S$c$. The net effect is therefore to short circuit contacts 43 and 49. With switch K in its right hand (silicon) position contact is also maintained between contacts 46 and 47. With switch K in its left hand (carbon) position however contact is broken between contacts 46 and 47 and coming from contact 43 of switch S$c$ by means of contact 44, and wire 45, I have contact 50, contact 51, wire 19, rheostat F $c$—$mn$—$si$, wire 32, contact 52, contact 47 and return to contact 49 of switch S$c$ by way of wire 48. The rheostat F $c$—$mn$—$si$ is thus placed in the carbon circuit.

In like manner with switch K in its left and (carbon) position, and in its center (manganese) position the silicon circuit is closed by contacts 55 and 38 which short circuit contacts 13 and 40 of switch S$si$ through wires 15 and 39; and with switch K in its left hand (carbon) or right hand (silicon) positions the manganese circuit is closed by means of contacts 57 and 29 or 56 and 34 respectively through wires 28 and 35.

(3) Set potentiometer P$_1$ at 100% and adjust $Pr$ to any convenient point, close switch L in either direction, throw switch M to the left, N to the left and $Ax$ to the right. Adjust $Ase$ and $Ash$ until a balance is obtained as indicated by zero deflection of the galvanometer.

(4) Throw switch N to the right set $P_1$ or $P_2$ to the percentage of carbon desired (in this case .90%) close switch $Sc$ and adjust rheostat $Ac$ to a balance. Repeat for the other element rheostats ($Amn$, $Asi$, etc.) using the corresponding switches ($Smn$, $Ssi$, etc.).

As noted above these steps (3 and 4) in the procedure of calculation are for the purpose of accurately adjusting the resistances of the individual element rheostats to represent the percentages of the elements contained in the charge and the charging materials. If the element rheostats are calibrated with sufficient accuracy these steps may be omitted but, since the available materials used in steel melting operations remain constant in composition over considerable periods of time, it may prove equally convenient and more accurate to adjust the rheostats by this method than to rely on a previous calibration. Most of the rheostats may of course be left in the same adjustment from one problem to another.

The method used in adjusting the rheostats is based on comparing the voltage drops across them with that across a known fixed resistance carrying the same current. The voltage drops are measured by means of one of the potentiometers $P_1$ or $P_2$. These are calibrated in terms of percentage so that the desired percentage may be set up on each rheostat by setting the potentiometer to this percentage in each case and then adjusting the rheostat until a balance is obtained. The functions of the various electrical units will be illustrated by setting up the percentages of elements in the charge which is given above, namely carbon .90%, manganese 1.10%, silicon 3.00% and iron 95.00%.

Switch L connects battery 6 to the potentiometers $P_1$ and $P_2$ as follows: battery 6, wire 58, contact 59, contact 60, wire 61, control rheostat $Pr$, wire 62, potentiometer $P_2$, wire 63, potentiometer $P_1$ wire 64, contact 65, contact 66 and return to battery 6 by wire 67. Switch L is a reversing switch of usual design and in the above I have assumed it to be in its right hand closed position. If it at any time becomes necessary to reverse the polarity of the potentiometers the switch may be closed in its left hand position. Rheostat $Pr$ is used to limit the voltage drop across the potentiometers to a desired portion of the battery voltage as per common practice. As before stated potentiometer $P_1$ is conveniently of such total resistance and so calibrated as to represent a maximum of 100% and also a maximum weight which should be comfortably in excess of the maximum furnace charge which is to be computed. $P_2$ is conveniently made with one tenth the total resistance of $P_1$ and is calibrated to a maximum of 10% and a maximum weight one tenth as great as $P_1$.

Switch M connects either $P_1$ or $P_2$ to the balancing circuit when thrown to the left or right respectively. Switch N connects the potentiometers to the individual element rheostats or to the standard resistances ($Az$, $Bz$, etc.) when in its right hand or left hand positions respectively. Switches $Ax$, $Bx$, etc. connect the batteries 1, 2, 3, etc. to their respective vertical series ($Ac$, $Amn$; $Bc$, $Bmn$, etc.) when in either their right hand or left hand positions. When in their right hand positions they also connect fixed resistances $Az$, $Bz$, etc. in series with their respective vertical series of rheostats.

With M left, N left and $Ax$ right I have: end of winding of potentiometer $P_1$, wire 64, contact 68 of switch M, contact 69, wire 70, wire 71, galvanometer at $G-$. Returning from the galvanometer at $G-$ I have wire 72, contact 73 of switch N, contact 74, wire 75, contact 76 of switch $Ax$, contact 77, wire 78, fixed resistance $Az$, wires 79, 81 and 80, contact 82 of switch $Ax$, contact 83, wire 84, contact 85 of switch N, contact 86, wire 87, contact 88 of switch M, contact 89 and wire 90 to the arm of potentiometer $P_1$. I thus have a circuit including a segment of potentiometer $P_1$, fixed resistance $Az$ and the galvanometer. The potentiometer segment and resistance $Az$ also form portions of other circuits and the voltage drops across them may be opposed by proper selection of polarity by means of switch L, and may be brought to a balance (with potentiometer $P_1$ set at 100%) by adjustment of the current through either or both circuits.

The other circuit which includes $Az$ is defined as follows: starting at the right hand end of shunt rheostat or potentiometer $Ash$, wire 105, contact 96 of switch $Ax$, contact 77, wire 78, resistance $Az$, wire 79, wire 81, rheostat $AFe$, wire 97, rheostat $Asi$, wire 98, rheostat $Amn$, wire 99, contact 101 of switch R, contact 100, wire 102, rheostat $Ac$, wire 103, wire 104 and return to the arm of shunt rheostat $Ash$. This circuit is supplied with current by reason of the voltage drop across the potentiometer or shunt rheostat $Ash$. This in turn is supplied with current from battery 1 as follows: starting with the positive terminal of battery 1, I have wire 91, contact 92 of switch $Ax$, contact 93, wire 94, series rheostat $ASe$, wire 105, shunt rheostat $ASh$, and return to the battery by wire 106. The combination of shunt and series rheostats $ASh$ and $ASe$ provides for accurate control of the current in the vertical series throughout a wide range—as is well known in the art.

Having established a current through the element rheostats and fixed resistance A$z$ of such value that the drop across A$z$ is equal to 100% on the potentiometer scale I can adjust the drops across the individual element rheostats to any desired part of 100% by balancing them against a corresponding setting of the potentiometer. In terms of percentage this is equivalent to making the percentage of A$z$ equal to 100%. When properly adjusted, the sum of the resistances of the element rheostats (A$c$, A$mn$, A$si$ and AF$e$) should equal the resistance of A$z$ and hence 100%. In using this method it is of course essential that the current in the circuit including A$z$ and the element rheostats should not change during the comparison. If the element rheostats are previously adjusted to approximately their correct resistances, the final adjustment will not seriously effect the current in the circuit since the adjustments involve only slight changes in the total resistance of the circuit. If the utmost accuracy is necessary however, the checking of A$z$ may be repeated after the preliminary adjustments, followed by a second set of adjustments of the element rheostats.

The circuit set up for balancing the individual element rheostats is illustrated by the following in which rheostat A$c$ is used as an example. Switch N is thrown from left to right, switch A$x$ remains closed to the right and switch S$c$ is closed. Since the percentage of carbon is low it is convenient to use potentiometer P$_2$ by throwing switch M to the right. Potentiometer P$_2$ is first set at .90%. Then, starting with rheostat A$c$ I have wire 103 and contact 107 of switch S$c$. As will be shown later, when switch S$c$ is closed all the carbon rheostats B$c$, D$c$, etc. are in series so the present circuit includes these rheostats and returns to contact 49. From contact 49 I have contact 108, wire 109, wire 110, through the galvanometer from G− to G+, wire 71, wire 70, contact 69 of switch M, contact 111, wire 112, wire 63, potentiometer P$_2$, wire 113, contact 114 of switch M, contact 88, wire 87, contact 115 of switch N, contact 116, wire 117, contact 118 of switch S$c$, contact 119, wire 120, wire 99 and return to rheostat A$c$ through switch R.

Although all the carbon rheostats (B$c$, D$c$, etc.) are included in the above circuit in addition to the particular rheostat (A$c$) being adjusted—the other rheostats do not introduce extraneous voltage into the circuit since the various vertical circuits in which they are included are opened at switches B$x$, D$x$, etc. The effect of their inclusion in the circuit is therefore only to increase its resistance. This is of no importance since only voltage is being measured—by a zero current method.

The adjustment of the other element rheostats in the A series is carried out in a similar manner—the particular element rheostat to be adjusted being selected by the closure of the corresponding switch SM$n$, SS$i$, etc. with all other S switches open. The same applies to the rheostats of the other vertical series (B, D, etc.)—using the switches B$x$, D$x$, etc. to select the series.

(5) As a check on the adjustments of the rheostats in a given series, switch S$t$ may be closed. This connects the potentiometer across the entire series and should give a balance at a potentiometer setting of 100%. The F$e$ rheostat of each series may be adjusted by the circuit thus established rather than by closure of SF$e$ and adjustment to the specified percentage of iron. By bringing the series to a balance at 100% by adjustment of the F$e$ rheostat I absorb the cumulative errors of adjustment of the other element rheostats in the adjustment of the former. This is desirable since the percentage of iron is of little importance in relation to the percentage of the other elements of the charge. The circuit established through the A series by the closure of ST is as follows: beginning at rheostat A F$e$, I have wire 81, wire 121, contact 122 of switch ST, contact 123, wire 117, contact 116 of switch N, contact 115, wire 87, contact 88 of switch M, contact 89, wire 90, potentiometer P$_1$ wire 64, contact 68 of switch M, contact 69, wire 70, wire 71, through galvanometer from G+ to G−, wire 110, wire 109, contact 124 of switch ST, contact 125, wire 126, wire 127, wire 32, rheostat F$c$—M$n$—S$i$, wire 19, wire 128, rheostat F F$e$, wire 129, wire 130, contact 131 of switch ST, contact 132, similarly through series E to contact 135, contact 136, similarly through series D to contact 142, etc.—coming finally from series B to contact 149, contact 150, wire 151, wire 103 and return through series A to rheostat A F$e$. It will be noted that in this circuit are included all the element rheostats in the instrument but that voltage is only introduced by the drop across series A. The resistance introduced in this case is considerable but the voltage to be measured is also high so that the accuracy of balancing is of the same order as that which obtains in the adjustment of the individual rheostats. It may be noted at this point that the circuit traced above serves as a test of practically the entire instrument for open circuits. This is an example of the ease with which faulty apparatus or wiring can be detected in this calculator—an inherent characteristic of its design.

(6) With switch N to the right, all switches A$x$, B$x$, etc., closed to the left and all S switches open, set the potentiometer at the desired weight of charge (1000 pounds in the present case), close switch A$y$ and balance by adjustment of rheostats AS$e$ and AS$h$. These operations result in setting up a voltage on the potentiometer which is representative of 1000 pounds and in making the voltage across the A series equal to it and hence also representative of 1000 pounds.

At this point it should be noted that in the foregoing adjustments the values of current used in the various vertical circuits bore no necessary relation to each other. I was concerned only in making the resistances of the rheostats in the various circuits proportional to the percentages they were chosen to represent. The necessary correlation of resistances was obtained by referring to fixed resistances $Az$, $Bz$, etc. (all of which are of equal resistance) as standards. In subsequent operations, however, voltage drops across all element rheostats or series of same must represent weight on a common basis. Hence the potentiometer current must remain constant and all voltage drops (and hence currents) must be adjusted using the potentiometer as a reference.

Closure of switches $Ax$, $Bx$, etc. in their left hand positions connects the batteries 1, 2, 3, etc. to their respective vertical series excluding therefrom fixed resistances $Az$, $Bz$, etc. The circuit established in series A for example is: positive of battery 1, wire 91, contact 92 of switch $Ax$, contact 152, wire 94, series rheostat $ASe$, wire 105, shunt rheostat or potentiometer $Ash$, and return to battery 1 by wire 106. The branch circuit from $Ash$ is: wire 105, wire 95, contact 153 of switch $Ax$, contact 82, wire 80, wire 81, rheostat $AFe$, wire 97, rheostat $ASi$, wire 98, rheostat $Amn$, wire 99, rheostat $Ac$ and return to $Ash$ by wires 103 and 104.

In order to extend the range of rheostat $Ac$ as mentioned above, the fixed resistance Q may be inserted in the circuit by throwing switch R to the right. In this case the circuit becomes — ... wire 99, contact 154 of switch R, contact 155, wire 156, resistance Q and rheostat $Ac$, instead of as traced above in the eighth paragraph under steps (3) and (4).

The closure of switch $Ay$ sets up a circuit which may be traced as follows: starting with rheostat $AFe$ as one end of series A, I have wire 81, wire 157, contact 158 of switch $Ay$, contact 159, wire 160, wire 87 to switch M and the potentiometer, returning from switch M by wire 70, wire 71, through the galvanometer from G+ to G−, wire 110, wire 161, contact 162 of switch $Ay$, contact 163 and return to the other end of the series at rheostat $Ac$ by wire 103.

(7) If a definite weight of one or more materials is to be charged such as discard metal from previous heats of steel, the weights of such additions should next be set up on suitable series by the same process used in (6). In the present case I assume however that all the other series available (B, D, E and F) are to be used to represent as yet indeterminate amounts of the four charging materials.

(8) With switch M remaining in the left hand position, and all $x$ switches closed and with all $y$ switches open, close $Sc$ and balance by adjustment of rheostats $Se$ and $Sh$ in series B, D, E and F. Open $Sc$, close $Smn$ and repeat the balancing. Continue in the same manner with $SSi$, and $SFe$ and repeat these operations as often as is necessary to obtain a balance for all elements. This is the essential step in the process of calculation which results in the actual solution of the simultaneous equations involved. The voltage across each element rheostat in the A series (representing the required charge) is in this step made equal to the sum of the voltages across the corresponding element rheostats in the other series (representing the charging materials). The significance of this in terms of weight is that the weight of each element required for making up the charge is supplied jointly by the available materials. Assuming that switch K is in its right hand position thus eliminating rheostat $Fc$—$Mn$—$Si$ from the carbon circuit I may trace the carbon circuit as follows: switch $Sc$ will of course be closed. Starting with rheostat $Ac$ I have wire 103, contact 107 of switch $Sc$, contact 164, wire 165, wire 145, rheostat $Bc$, wire 144, wire 174, contact 166 of switch $Sc$, contact 167, wire 168, wire 20, wire 138, rheostat $Dc$, wire 137, wire 169, contact 170, contact 171, wire 172, wire 25, wire 175, rheostat $Ec$, wire 41, wire 42, contact 43, contact 44, wire 45, contact 46, contact 47, wire 48, contact 49, contact 108, wire 109, wire 110, through galvanometer from G− to G+, wire 71, contact 176 of switch N, contact 116, wire 117, contact 118 of switch $Sc$, contact 119, wire 120 and return to rheostat $Ac$ by wire 99.

All carbon rheostats are thus included in a circuit which is closed through the galvanometer. Each of the rheostats is also included in a separate outside circuit provided with its own source of current. It will also be noted that the rheostats are all connected in the main circuit in the same direction but that the battery supplying the rheostat $Ac$ is reversed in polarity with respect to those supplying the others. When the circuit is first closed the current in it will naturally divide in a complex manner, adding to or opposing the flow of currents in the branch circuits. We are not concerned however with the manner in which it divides but rather with the fact that a current does flow as indicated by the galvanometer. By adjustment of the various $Se$ and $Sh$ rheostats we arrive at a condition in which no current flows in the circuit. In this condition it is obvious that the voltage drop across $Ac$ is exactly equal to the sum of the opposing voltage drops across the other rheostats.

The balancing operation is essentially a trial and error process in that the balancing of one element by adjustment of the series containing its greatest percentage may introduce excessive quantities of the other elements contained in this series. For this reason it may be necessary to repeat the balancing several times—the amount of repetition and hence the time required depending on the experience of the operator. In general, the first adjustment should be made in that series containing the greatest percentage of a single element or in the series representing the least complicated analysis. For example, in the case of the materials given above, I adjust the F (ferro-silicon) series first, the E (ferro-manganese) series second and so on. With a little practice it becomes possible to approach the balance of all elements without completely balancing any individual element and hence without greatly exceeding the required amounts of any of the others.

(9) When a balance for each element has been obtained as outlined above, a check on the total balance (weight of charge against weight of charging materials) may be obtained by closing switch ST. This places all the series of element rheostats in a single circuit with the voltage across the entire A circuit opposed by the sum of the voltages across the other circuits. The essential parts of the circuit thus established have been traced under step (5).

(10) Throw switch N to the right and with all S switches open and $x$ switches closed, close switch B$y$ and balance with potentiometer $P_1$ or $P_2$, reading the potentiometer when balance is obtained in terms of weight. Repeat this operation by closing switches D$y$, E$y$ and F$y$ one at a time. The weights read on the potentiometer should be the weights of the respective charging materials.

Taking series B as an example, the circuit set up in this step by the closure of switch B$y$ is as follows: starting with rheostat BF$e$ as one terminal of series B, I have wire 148, wire 177, contact 178 of switch B$y$, contact 179, wire 161, wire 110, through galvanometer from G− to G+, wire 71, wire 70 to potentiometer $P_1$ or $P_2$, returning from potentiometer by wire 87, wire 160, contact 180 of switch B$y$, contact 181, wire 144 to rheostat B$c$ which is the other terminal of series B. In this circuit I have the voltage drop across series B opposed by the potentiometer drop. The current in series B has been so adjusted in step 8 that the voltage drop across the series represents the weight of material (in this case scrap steel) which, together with the other available materials, is required to make up the charge. This voltage is read on the potentiometer in terms of weight.

I have illustrated above the calculation of the materials required to produce a given weight of a given analysis. It will be obvious that the apparatus can equally well be used for the solution of the much simpler type of problem in which the weights of a number of materials of given analysis are given and it is required to find the analysis and weight of the resulting mixture. In this case the total weight of mixture is first determined by adjustment of A—S$e$ and A—S$h$ in conjunction with $S_T$ and the analysis then found by adjustment of the individual rheostats in the A series in connection with their corresponding S switches. Changes in total resistance of the A series due to individual rheostat adjustments must be taken care of by repetition as above.

Solution of the problem given above by means of simultaneous equations (and using a slide rule) requires at least 15 minutes by one of ordinary mathematical ability. With only limited experience the same work can be done by means of the calculator in from seven to eight minutes. The time required for more complex problems increases about linearly with the increasing number of elements and furnace additions when the calculator is used; while in the case of mathematical solution of simultaneous equations the time increases at least as the square of the number. The latter is also approximately true of the methods of approximation heretofore used in calculating charges.

Having thus described my invention what I claim as new and desire to secure by Letters Patent is:

1. In a calculating device, variable means for establishing interdependent values of resistance, current and potential in electric circuits, means for adjusting said values in terms of numerical quantities to be treated mathematically and means for evaluating the results of interaction of said values in terms of said quantities.

2. In a calculating device, an element having an electrical resistance bearing a known relation to a numerical quantity, means for passing through said element a current the intensity of which bears a known relation to a second numerical quantity, and means for determining the electrical potential drop across said resistance in terms of a third numerical quantity.

3. In a calculating device, a variable electrical resistance, means for adjusting said resistance in terms of a numerical quantity, means for connecting said resistance to a source of current, means independent of said resistance for controlling the intensity of current through said resistance, means for measuring said intensity in terms of a second numerical quantity, and means for determining the potential drop across said resistance in terms of a third numerical quantity.

4. In a calculating device, two or more variable resistances adjustable in terms of numerical quantities, means for supplying electric currents to said resistances, means for controlling said currents, means for measuring said currents in terms of other numerical quantities, means for measuring the potential drops across said resistances in terms of other numerical quantities and/or for balancing any one of said potential drops or the sum of any number of said potential drops against any other one or sum of said potential drops.

5. In a calculating device, a plurality of variable resistances adjustable in terms of numerical quantities and connected in series, means for connecting said resistances to a source of electric current, means independent of said resistances for adjusting the intensity of current through said resistances in terms of a numerical factor, and means for determining the potential drops across said variable resistances in terms of other numerical quantities.

6. In a calculating device, means for representing compound numerical factors consisting of series of variable resistances each of said resistances being capable of adjustment to represent a term of one of said compound factors, means independent of said resistances for controlling the current through each of said series in terms of a numerical factor, means for measuring the potential drop across any of said resistances in each of said series in terms of numerical quantities, and means for balancing the potential drop across any resistance in one of said series against the potential drop across any resistance in any other of said series or against the sum of the potential drops across corresponding resistances in a plurality of others of said series.

7. In a calculating device, means for representing compound numerical factors consisting of series of variable resistances, means for supplying electric current to said series, means independent of said resistances for controlling the current through each of said series, means for measuring the potential drop across any of said resistances in terms of numerical quantities, means for measuring the potential drop across any of said series in terms of other numerical quantities, and means for balancing the potential drop across any resistance of one of said series or the sum of the potential drops across corresponding resistances of a plurality of said series against the potential drop across a corresponding resistance of another series or against the sum of the potential drops across corresponding resistances in a plurality of other series.

8. In a calculating device, a plurality of series of variable resistances adjustable in terms of percentage, means for supplying electric current to said series, means for individually adjusting the current in each of said series in terms of numerical quantities the percentages of which are represented by the resistances in their respective series, means for measuring the potential drop across any of said resistances in terms of numerical quantities, and means for balancing the potential drop across any of said resistances in one of said series or the sum of the potential drops across corresponding resistances in a plurality of said series against the potential drop across the corresponding resistance in another of said series or against the sum of the potential drops across corresponding resistances in a plurality of other series.

9. In a calculating device, a plurality of series of variable resistances, means for supplying electric current to said series, means for individually controlling the intensity of current in each of said series, means for measuring the potential drop across said resistances in terms of percentage, means for measuring the potential drop across said series in terms of numerical quantities, and means for balancing the potential drop across any of said resistances in one of said series or the sum of the potential drops across the corresponding resistances in a plurality of said series against the potential drop across the corresponding resistance in another of said series or against the sum of the potential drops across corresponding resistances in a plurality of other series.

10. In a calculating device, a plurality of rheostats adjustable in terms of numerical quantities, a plurality of current control rheostats, a potentiometer calibrated in terms of numerical quantities, a plurality of sources of electric current, a galvanometer, conductors connecting said rheostats in a plurality of series, conductors connecting one or more of said control rheostats in series and/or shunt with each of said series, variable means for connecting said series to said sources of electric current, the polarity of one or more of said sources when so connected being reversed with respect to that of the others, variable means for connecting the terminals of said series exclusive of said control rheostats to said potentiometer and galvanometer to form a complete series circuit therewith, and means for connecting in series correspondingly designated rheostats in a plurality of said series and for completing an electric circuit therewith through said galvanometer for the purposes above set forth.

11. In a calculating device, a plurality of rheostats adjustable in terms of numerical quantities, a plurality of current control rheostats, a potentiometer calibrated in terms of numerical quantities, a plurality of sources of electric current, a galvanometer, conductors connecting said rheostats in a plurality of series, conductors connecting one or more of said control rheostats in series and/or shunt with each of said series, variable means for connecting said series to said sources of electric current, variable means for connecting the terminals of said series exclusive of said control rheostats to said potentiometer and galvanometer to form a complete series circuit therewith, and means for connecting in series correspondingly designated rheostats in a plurality of said series and for completing an electric circuit therewith through said galvanometer in which a flow of electric current is opposed in direction to the potential drop across the rheostats of one or more of said series included therein.

12. In a device for calculating furnace charges, a plurality of series of variable resistances, the individual members of which are calibrated in terms of percentages of chemical elements, means for supplying electric current to each of said series and for adjusting same in terms of quantities of the charging materials or of the charge desired, means for measuring the potential drops across said variable resistances in terms of quantities of chemical elements, and means for balancing the potential drop across any of said resistances in one of said series or the sum of the potential drops across the resistances representing the same element in a plurality of said series against the potential drop across the resistance representing the same element in another of said series or the sum of the potential drops across the resistances representing the same element in a plurality of other series.

13. In a calculating device, electric circuits containing means for representing numerical quantities by values of resistance current and potential proportional to said quantities, connecting means for producing interaction of said values in accordance with the desired mathematical operations upon the quantities represented thereby and electrical measuring means for evaluating the results of said interaction in terms of said quantities.

In testimony whereof I hereunto affix my signature.

CLEMSON H. WARD.